UNITED STATES PATENT OFFICE.

VICTOR G. BLOEDE, OF CATONSVILLE, MARYLAND.

PROCESS OF MANUFACTURING VEGETABLE GLUE.

1,273,571. Specification of Letters Patent. Patented July 23, 1918.

No Drawing. Application filed December 17, 1917. Serial No. 207,556.

*To all whom it may concern:*

Be it known that I, VICTOR G. BLOEDE, a citizen of the United States, residing at Catonsville, in the county of Baltimore and State of Maryland, have invented new and useful Improvements in the Processes of Manufacturing Vegetable Glue, of which the following is a specification.

This invention relates to an improvement in the production of adhesives from amylaceous or starch bases, which may also be used for sizing and stiffening purposes in textile work being of similar character to the product described and claimed in my application for Letters Patent of the United States #198,989, filed October 29th, 1917, based upon acting upon a starch paste by a ferment, enzym or bacilli having starch reducing or digesting properties; the object of the invention being the production of a powerful vegetable glue, or sizing, in a more concentrated and workable form, as well as of greater binding strength, and elasticity than can be obtained by any of the heretofore existing processes.

In the process which forms the subject of my previous application #198,989 referred to above, the starch, or amylaceous, matter is first acted upon by a caustic alkali in the well known manner which serves the purpose of unlocking the starch granules, and producing a smoother and more homogeneous paste, than can be obtained by using water alone, that is to say, a paste which possesses much greater homogeneity through the finer subdivision and diffusion of the starch granules.

The product of this alkaline process in cooking starchy matter possesses highly alkaline or caustic properties, and before it can be successfully acted upon by an enzym or bacilli must be brought to a neutral, or nearly neutral, condition by treatment with an acid. This process involves considerable time and labor, as well as expense and delay, in carrying out the operation, for which reason a simpler, and hence more economical process producing an equally desirable product is sought for.

After an extensive series of experiments I have succeeded in perfecting such a process, which, while not requiring the use of a caustic alkali and a subsequent neutralization, produces a product of equal, if not superior quality of great practical value in the arts requiring a powerful adhesive or binding material.

My process is based upon the fact that there are a number of neutral salts, which, under proper condition, effect the unlocking of the starch granules and produce as smooth and homogeneous a paste as that secured by the action of a caustic alkali.

Foremost among such salts, both from the standpoint of efficiency and economy, may be named the chlorid of calcium, and chlorid of magnesium. There are a number of other chemical compounds, or salts, which exercise a solvent action on starch granules, and I therefore do not limit myself to the use of the two salts named as I can employ any other equivalent compound. By "equivalent" I mean any neutral, slightly acid, or slightly alkaline chemical salt or compound, which, while exercising a solvent action upon starch granules, will not interfere with the subsequent action of the ferment, enzym, or bacilli, to be used as a reducing agent, that is, a chemical compound that does not kill or retard the action of the enzym, or bacilli.

It has been found in practice that the chlorids of the alkalis, as a general rule, not only do not retard the reducing action of the so-called starch digesting, or reducing, enzyms or bacilli, but actually stimulate and increase their power if not present in excessive quantities.

As an example of a salt, which, while effective in increasing the solubility of the starch, yet possesses the property of greatly lessening or entirely killing the reducing properties of the enzyms or bacilli, I may name chlorid of zinc.

In the selection of a suitable salt, or "equivalent" compound, other than chlorid of calcium, or chlorid of magnesium, it is therefore necessary for the proper carrying out of my process to consider these two points, namely, that the salt used has the necessary solvent action on the starch granules, and that it does not detrimentally affect the action of the enzym or bacilli to be used as a reducing agent. I therefore claim as an equivalent of chlorid of calcium, or chlorid of magnesium, any salt or chemical compound possessing the two properties named above.

Having now described the general character of my process, I will give a detailed description of the method by which I carry out the operation in practical working. In manufacturing my vegetable glue, or adhesive composition, I proceed as follows:

In a steam jacketed kettle provided with a powerful mechanical agitator, and preferably also equipped with a pipe with fine perforations for the purpose of injecting live steam into the body of the composition, I place 100 pounds of starch, or other amylaceous matter to be operated upon. To this I add, say 100 pounds more or less of cold water, and agitate the mixture until a smooth cream, free from lumps and clots, has been formed. I then add to the contents of the kettle from 2 to 10 pounds more or less of chlorid of calcium, or an equivalent salt as previously described, dissolved in 100 pounds more or less of water, and continue the agitation for a few minutes, or until an intimate mixture of all of the ingredients has been effected. Steam is then turned on and the contents of the kettle brought up to, or near, the boiling point, at which temperature the composition is kept until a perfectly clear, homogeneous and smooth, paste has been formed, free from any clotty or grainy appearance, when allowed to drop from a paddle or spatula. To bring about this condition in the paste requires from twenty minutes to an hour or more of cooking, according to the temperature and the amount of the calcium, or equivalent salt, employed. When the desired state of clearness and homogeneity has been reached in the paste the composition is cooled to say 115 degrees to 120 degrees F., preferably under constant agitation. The cooling may be facilitated by running cold water through the jacket of the kettle, although I prefer, where time is not a special object, to allow the composition to cool normally.

When the temperature of the composition has fallen to, or below, 120 degrees F., I work into the clear and viscous mass of starch jelly an enzym or bacilli capable of reducing starch. There are a number of these known to science which it is not necessary to name, and which as a rule are not pure cultures or preparations, but somewhat complex combinations.

It would obviously be impossible to give definite weights or measures as to the quantity of these enzyms or bacilli cultures to be used, as well as the character of the starch operated upon, the temperature and character of the product desired. If the enzym or bacilli are of proper strength and activity, two or three ounces will suffice to secure various stages of liquefaction in a very short time.

I prefer to work with very dilute solutions and a minimum quantity of these reducing agents because I have found that I can maintain better control of the composition in this way, as well as a better product, practically free from glucose, yet effecting the desired degree of reduction within the short space of from 10 to 30 minutes.

I have found the preferable manner of operating to be to dilute the enzyms of bacilli culture with from 5 to 10 parts of water, then add an ounce or two of this dilute solution to the starch paste, allowing it to act for a few minutes and following it by further addition every five or ten minutes until the thinning action becomes apparent when further addition should be suspended, but allowing the action to continue, preferably under constant agitation, until the desired degree of consistency has been reached.

In order to avoid over-conversion it is well to stop the action of the reducing agent while the composition is still somewhat thicker than desired when the product is finished, as there is always a further conversion before the action of the reducing agent can be stopped.

As soon as the proper viscosity or body has been reached the further action of the converting agent is stopped the contents of the kettle is brought to the boiling point as rapidly as possible and the heat continued for some fifteen or twenty minutes to insure the destruction of the reducing agent. The action of the enzym or bacilli may also be stopped by the addition of any of the well known germicides, but I have found rapid heating the surest and best method of accomplishing this end.

I have found in practice that a neutral or slightly acid condition of the starch paste is most favorable to the rapid action of the reducing agents, but I have also secured good results, although slower, when operating with starch paste in slightly alkaline condition, the product in this case being clearer in appearance than that obtained from neutral or acid solutions and somewhat more flexible or elastic when dried.

The product from the operation just described should be of the consistency of honey, and should weigh about 350 pounds. This material may be diluted by the addition of hot water to any extent desired or concentrated by evaporation. The appearance of the product is more or less milky according to the degree of conversion and the character of the reducing agent employed.

It is important in carrying out my process to select a starch having the greatest possible body or viscosity when made into a paste with a given amount of water, for the reason that I have found that the starches of higher viscosity produce very much stronger adhesives than those of a lower body or viscosity. In view of this fact and that the regulation of the consistency of the product is dependent upon the subsequent action of the digesting agent, it is not desirable to use any starch base previously hydrolyzed, or partly hydrolyzed, although such derivatives of starch also produce results possessing more or less valuable properties although of greatly reduced viscosity, and I include hydrolyzed starches within the scope of my invention.

Any form or species of starch is more or less adapted to the requirements of my process, but I have found potato and tapioca starches to yield the strongest and most desirable adhesives, while corn starch, wheat starch and sago may be employed when the requirements are less exacting.

There is an alternative method of operating my process which, especially in unskilled or inexperienced hands, yields better and more uniform results than the method I have just described. This second method consists in removing a portion of the starch paste from the kettle after cooking and cooling same, placing it in a second agitator or other suitable vessel and adding the reducing agent to this portion of the material, and when reduced to the desired degree of consistency, or flow, sterilizing it and returning the thin product to the first kettle and blending the two compositions by agitation.

Still another practical method is to keep a stock of the thin material on hand and add it to an unreduced paste in such proportions as may be found desirable, by which method any degree of body or viscosity can be secured in the finished product, that is to say, the fluidity of the vegetable glue can be lowered or increased to meet the special requirements of the work to which it is to be applied.

The product resulting from my process is a distinct improvement on any other form of vegetable glue hitherto known or used, either in woodworking, such as veneer, panel and joint work, for paper and pasteboard work or in the sizing or stiffening of textile fabrics in all of which important branches of manufacture it can in many cases be successfully used as a substitute for animal glue.

In the execution of my process I have found wide variations in the proportion of the ingredients possible. As a rule the larger the percentage of the starch-solubleizing salt used, within reasonable limits, the better the results, but in this connection it must be borne in mind that some of these salts like chlorid of calcium and chlorid of magnesium, to which I give the preference on account of their low cost and satisfactory operation, are highly deliquescent and hence should not be used in such quantity as to cause a subsequent softening of the glue when dried and exposed to extreme humidity, and for this reason I have mentioned 10 per cent. of the weight of the dry starch as a maximum limit in the use of these salts, although for some purposes this limit may be exceeded. A certain amount of moisture-absorbing properties in the glue is not objectionable, as it tends to increase the toughness or elasticity of the product, but care must be taken that the finished product is not too hygroscopic.

I have found also that the new vegetable glue described herein can be reduced from the paste form into a dry product by evaporation at a low temperature without losing any of its valuable properties, and that when such dry product is softened by allowing it to remain in water for some hours, it can then be redissolved by cooking same, like animal glue.

In carrying out my process I do not confine myself to any particular form of starch, nor to the exact proportions of the various ingredients or the precise treatment or salt I have given as an example in the foregoing specification.

I am aware that there is nothing novel in cooking starch with neutral salts for the purpose of producing hygroscopic sizings for textile work. I am also aware that the action of ferments, enzyms and bacilli cultures in reducing or digesting starch and other amylaceous bodies has been known for a number of years, hence I do not claim any of these processes broadly, but,

I claim:

1. The process herein described for producing a vegetable glue or adhesive in paste form consisting in, first, treating amylaceous matter with water containing a neutral salt possessing the property of increasing the solubility of the starch granules, but which does not prevent or materially retard the action of starch-reducing enzyms or bacilli; then heating this composition to, or near, the boiling point and continuing the heating until a smooth and homogeneous paste is formed, and after cooling same to the proper temperature, acting upon this composition by a starch reducing enzym or bacilli until the desired consistency, or flow, has been secured, substantially as set forth.

2. The process herein described for producing a vegetable glue or adhesive in solid form consisting in, first, treating amylaceous matter with water containing a neutral salt possessing the property of increasing the solubility of the starch granules, but which does not prevent, or materially retard, the action of starch-reducing enzyms or bacilli; then heating this composition to, or near, the boiling point and continuing the heating until a smooth and homogeneous paste is formed, and after cooling same to the proper temperature acting upon this composition by a starch reducing enzym or bacilli until the desired consistency, or flow, has been secured, then evaporating the vegetable glue so obtained to a solid form at a low temperature, substantially as set forth.

VICTOR G. BLOEDE.

Witnesses:
 WM. H. THOMAS, Jr.,
 E. B. WILLIAMS.